(12) United States Patent
Qi et al.

(10) Patent No.: US 9,597,635 B2
(45) Date of Patent: Mar. 21, 2017

(54) ZEOLITE PROMOTED SILVER BASED CATALYST FOR NOX STORAGE

(71) Applicant: GM GLOBAL TECHNOLOGY OPERATIONS LLC, Detroit, MI (US)

(72) Inventors: Gongshin Qi, Troy, MI (US); Steven J. Schmieg, Troy, MI (US); Shouxian Ren, Ypsilanti, MI (US); Wei Li, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 118 days.

(21) Appl. No.: 14/559,983

(22) Filed: Dec. 4, 2014

(65) Prior Publication Data
US 2016/0158700 A1  Jun. 9, 2016

(51) Int. Cl.
*B01D 50/00* (2006.01)
*B01D 53/94* (2006.01)
*B01J 29/12* (2006.01)
*F01N 3/08* (2006.01)
*F01N 3/021* (2006.01)
*F01N 13/00* (2010.01)

(52) U.S. Cl.
CPC ........ *B01D 53/9431* (2013.01); *B01J 29/126* (2013.01); *F01N 3/021* (2013.01); *F01N 3/0814* (2013.01); *F01N 3/0842* (2013.01); *B01D 2255/102* (2013.01); *B01D 2255/104* (2013.01); *B01D 2255/2092* (2013.01); *B01D 2255/50* (2013.01); *B01D 2255/9032* (2013.01); *F01N 13/009* (2014.06); *F01N 2510/063* (2013.01)

(58) Field of Classification Search
CPC ................... F01N 3/101; F01N 3/2066; B01D 2255/2063; B01D 2258/012; B01J 2523/00; B01J 2523/3706
USPC .................................................. 422/168, 171
See application file for complete search history.

(56) References Cited

U.S. PATENT DOCUMENTS

| | | | | |
|---|---|---|---|---|
| 5,727,385 A | * | 3/1998 | Hepburn | B01D 53/9418 423/213.7 |
| 2008/0236142 A1 | * | 10/2008 | Sloane | B01D 53/9409 60/274 |
| 2011/0011068 A1 | * | 1/2011 | Ren | B01D 53/9477 60/297 |
| 2013/0315791 A1 | * | 11/2013 | Tsukamoto | F01N 9/00 422/174 |

FOREIGN PATENT DOCUMENTS

JP           5178164 B2 *  4/2013  ............ B01J 29/068

* cited by examiner

Primary Examiner — Tom P Duong

(57) ABSTRACT

An aftertreatment system utilizes chemical reactions to treat an exhaust gas flow. A device for use within an aftertreatment system includes a silver-based NOx storage catalyst and a zeolite. The silver-based NOx storage catalyst and the zeolite store NOx through a low temperature startup period of operation. In one embodiment, the zeolite includes a barium Y zeolite.

18 Claims, 3 Drawing Sheets

ZEOLITE PROMOTED SILVER BASED CATALYST FOR NOX STORAGE

TECHNICAL FIELD

This disclosure is related to aftertreatment of NOx emissions from combustion processes.

BACKGROUND

The statements in this section merely provide background information related to the present disclosure. Accordingly, such statements are not intended to constitute an admission of prior art.

Emissions control is one factor in engine design and engine control. One particular emission, NOx, is a known by-product of combustion. NOx is created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures.

NOx molecules, once created in the combustion chamber, can be converted back into nitrogen and water molecules in exemplary devices known in the art within the broader category of aftertreatment devices. Aftertreatment devices are known, for instance, utilizing chemical reactions to treat an exhaust gas flow. One exemplary device includes a selective catalytic reduction (SCR) device. An SCR utilizes a reductant capable of reacting with NOx to treat the NOx. One exemplary reductant is ammonia derived from urea injection. A number of alternative reductants are known in the art. Ammonia stored on a catalyst bed within the SCR catalysts reacts with NOx, preferably an equimolar mixture of NO and $NO_2$, and produces favorable reactions to treat the NOx. It is known to operate a diesel oxidation catalyst (DOC) containing Platinum Group Metals (PGM, typically Pt and Pd) upstream of the SCR in diesel applications to convert a fraction of the NO into $NO_2$ preferable to treatment in the SCR and additionally oxidize HC (hydrocarbons) and CO (carbon monoxide). A diesel particulate filter (DPF) device can additionally be used to trap and/or remove particulate matter from the exhaust gas flow.

NOx reduction efficiency in an aftertreatment system is temperature dependent. Testing shows in exemplary engine and aftertreatment configurations that up to 50% of total NOx emissions from a tailpipe of the configurations can occur during the vehicle cold-start before the downstream SCR catalyst is sufficiently active to react the NOx. NOx can be stored until it can be reduced selectively to nitrogen via reaction with urea/ammonia at higher temperature (for example, greater than 180° C.). However, an exemplary silver/alumina catalyst used for NOx storage is active when temperature is low (for example, greater than 75° C.)

SUMMARY

An aftertreatment system utilizes chemical reactions to treat an exhaust gas flow. A device for use within an aftertreatment system includes a silver-based NOx storage catalyst and a zeolite. The silver-based NOx storage catalyst and the zeolite store NOx through a low temperature startup period of operation.

BRIEF DESCRIPTION OF THE DRAWINGS

One or more embodiments will now be described, by way of example, with reference to the accompanying drawings, in which.

DETAILED DESCRIPTION

Figure 1A:
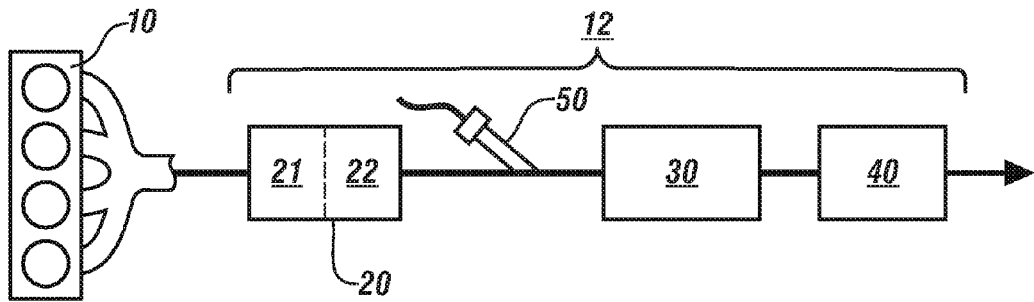
FIG. 1A illustrates an exemplary aftertreatment system treating an exhaust gas flow from an engine including a zone coated catalyst device including a silver-based catalyst in combination with a zeolite, in accordance with the present disclosure.

Depending upon a number of variables, aftertreatment systems can include a number of different components or modules, including diesel oxidation catalysts (DOC), selective catalytic reduction (SCR) devices, diesel particulate filters (DPF), and three way catalysts (TWC) (for use in gasoline powered systems.) These various modules can be arranged in various ways. The examples provided within the disclosure are intended as non-limiting examples, and the disclosure is not intended to be limited to the examples provided herein.

An SCR device receives a supply of ammonia, for example, from a flow of urea provided by a urea injector device, to treat NOx within the aftertreatment system. An SCR device includes an SCR catalyst material in the form of a coating on a cordierite substrate to store ammonia and facilitate the chemical reaction that occurs within the SCR device, speeding the conversion of NOx and ammonia into desired exhaust components including nitrogen gas and water.

A catalyst can also be used to store NOx temporarily until conditions for NOx reduction exist or a purge cycle can be operated to clean up adsorbed NOx stored on the catalyst. One exemplary NOx storage catalyst includes a silver/alumina catalyst. However, effective storage of NOx on a catalyst such as a silver/alumina catalyst only becomes possible at operating temperatures over a low temperature threshold. Because operating temperatures on cold-start begin below a typical low temperature threshold for known NOx storage catalysts, a time exists during startup prior to the operating temperature rising to the low temperature threshold wherein NOx storage is not possible. During this low temperature cold-start period, expensive PGM (platinum group metal) storage devices called passive NOx adsorbers can be used to store NOx, but increasing use of such high amount of PGM is cost prohibitive.

NOx within an exhaust gas flow includes both NO and $NO_2$. Catalysts providing for temporary storage of NOx in some embodiments are configured to store $NO_2$ and are either less effective or not effective at storing NO. Methods and aftertreatment systems are known to use Hz-assisted aftertreatment to react NO into $NO_2$ for effective catalyst storage. A method and system for nitric oxide oxidation over silver-based catalysts is disclosed in co-pending U.S. Patent Application Publication No. 2013/0294989 A1, which is hereby incorporated by reference. A method and system for a silver promoted close-coupled NOx adsorber is disclosed in co-pending U.S. Patent Application Publication No. 2013/0294990 A1, which is hereby incorporated by reference. A low temperature NOx storage system for lean exhaust aftertreatment is disclosed in co-pending U.S. Patent Application Publication No. 2012/0210696, which is hereby incorporated by reference.

Certain zeolite materials have shown in testing an ability to store NOx at low temperatures. An aftertreatment system using a silver based catalyst for NOx storage can improve low temperature performance by additionally using a zeolite material for low temperature NOx storage. A non-limiting exemplary zeolite, barium exchanged Y zeolite (BaY), is provided with advantageous NOx storage performance at temperatures within typical startup ranges. Other exemplary zeolites can be utilized. Base zeolites such as Y zeolite, beta zeolite, ZSM-5, SSZ-13 (an aluminosilicate zeolite mineral known in the art), and SAPO-34 (silicoaluminophosphate 34) can be utilized. Base metals such as copper, iron, silver, or barium can be utilized as doped or exchanged zeolites. Alternatively or additionally, the disclosed zeolites can be used in combination with PGM (platinum or palladium).

In one embodiment, the disclosed zeolites can be dispersed as a separate layer on top of an exemplary $Ag_2O/Al_2O_3$ catalyst. In another embodiment, the disclosed zeolites can be dispersed as a separate layer under the exemplary $Ag_2O/Al_2O_3$ catalyst. In another embodiment, the disclosed zeolites can be dispersed uniformly within a washcoat with $Ag_2O/Al_2O_3$ catalyst.

Referring now to the drawings, wherein the showings are for the purpose of illustrating certain exemplary embodiments only and not for the purpose of limiting the same, FIG. 1A illustrates an exemplary aftertreatment system treating an exhaust gas flow from an engine including a dual zoned catalyst device including a silver-based catalyst in combination with a zeolite. Exemplary diesel engine 10 is illustrated, combusting a fuel air mixture to generate mechanical power, and as a result of the combustion, an exhaust gas flow including chemical byproducts of the combustion process is forced through exhaust aftertreatment system 12. Exemplary aftertreatment system 12 includes a dual zoned catalyst device 20, an SCR device 30, and a DPF device 40. Dual zoned catalyst device 20 includes first zone 21 configured with a catalyst such as a silver based catalyst and zeolite combination as disclosed herein to facilitate a Hz-assisted NO to $NO_2$ reaction and storage within the first zone. Zone 22 of device 20 includes a catalyst such as a known PGM catalyst. Urea injector device 50 is illustrated supplied with a flow of urea which is injected into the aftertreatment system 12 upstream of SCR device 30. SCR device 30 includes a catalyst in order to facilitate treatment of NOx within device 30. The arrangement of devices within aftertreatment system 12 is exemplary and non-limiting, and other configurations and other devices utilizing ammonia oxidation catalysts can similarly be arranged and utilized.

Silver-based catalysts are known for use within a catalyst device. By combining a silver-based catalyst within zone 21 of device 20 with use of a zeolite, increased NOx storage at low temperatures can reduce NOx emissions during system startup.

Figure 1B:
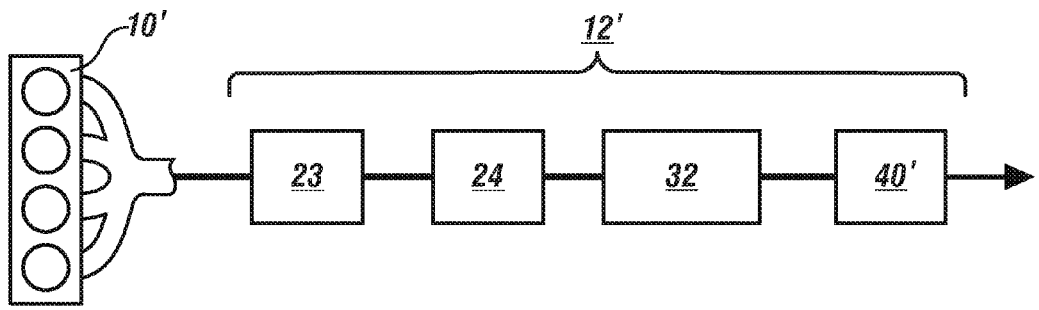
FIG. 1B illustrates an exemplary aftertreatment system treating an exhaust gas flow from an engine including sequential catalyst devices including a silver-based catalyst in combination with a zeolite, in accordance with the present disclosure.

FIG. 1B illustrates an exemplary aftertreatment system treating an exhaust gas flow from an engine including sequential catalyst devices including a silver-based catalyst in combination with a zeolite. Exemplary diesel engine 10' is illustrated, combusting a fuel air mixture to generate mechanical power, and as a result of the combustion, an exhaust gas flow including chemical byproducts of the combustion process is forced through exhaust aftertreatment system 12'. Exemplary aftertreatment system 12' includes a first catalyst device 23, a second catalyst control device 24, a lean NOx trap device 32, and a DPF device 40'. First catalyst device 23 is configured with a catalyst such as a Ag combination with zeolite catalyst to facilitate a $H_2$-assisted NO to $NO_2$ reaction and storage within the first device. Second catalyst device 24 includes a PGM catalyst as disclosed herein. The silver based catalyst can convert NO to $NO_2$ in the presence of CO and HCs at low temperatures. Lean NOx trap device 32 includes a catalyst in order to facilitate storage and later treatment of NOx. Throughout the disclosure, any embodiment disclosed including an SCR device can additionally or alternatively utilize a lean NOx trap according to configurations and aftertreatment methods known in the art. The arrangement of devices within aftertreatment system 12' is exemplary and non-limiting, and other configurations can similarly be arranged and utilized.

Figure 2:
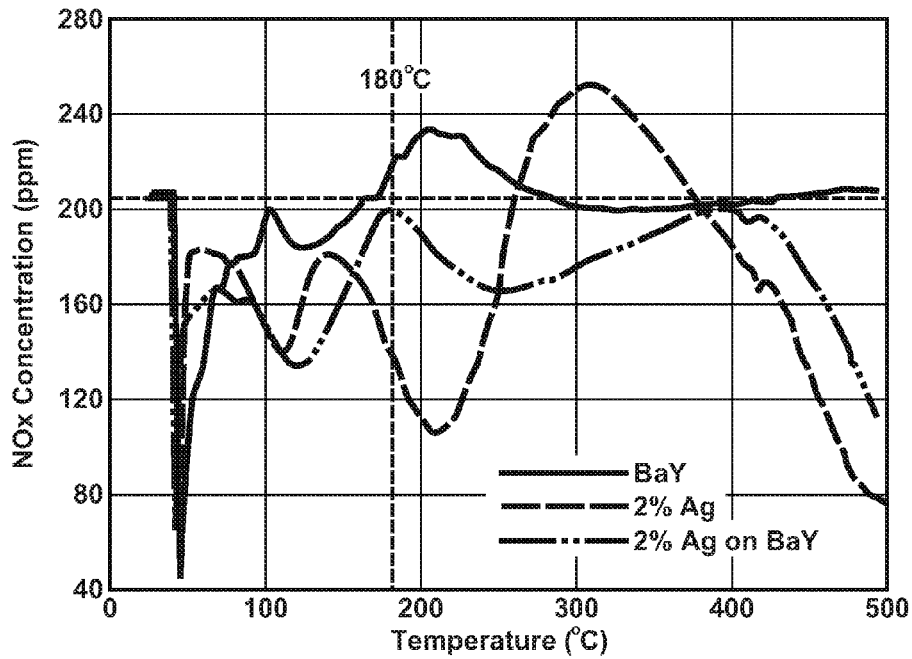
FIG. 2 graphically illustrates NOx concentration measured downstream of a NOx storage device storing NOx through a cold start period, in accordance with the present disclosure.

FIGS. 2-5 illustrate various aspects of test data showing a system iteratively tested with a silver-based catalyst alone, an exemplary BaY zeolite tested alone, and a combination of a silver-based catalyst used with a BaY zeolite. FIG. 2 graphically illustrates NOx concentration measured downstream of a NOx storage absorber device storing NOx through a startup period. The horizontal axis illustrates temperature through a startup event, with the measured values beginning at ambient temperature and progressing to the right to a high operating temperature. A vertical dotted line at 180° C. illustrates an exemplary temperature at which an ammonia reduction reaction can be operated with a downstream SCR device and NOx within the exhaust gas flow is treatable. The vertical axis illustrates NOx concentration within the exhaust gas flow measured at the inlet of the NOx storage device.

Figure 5:
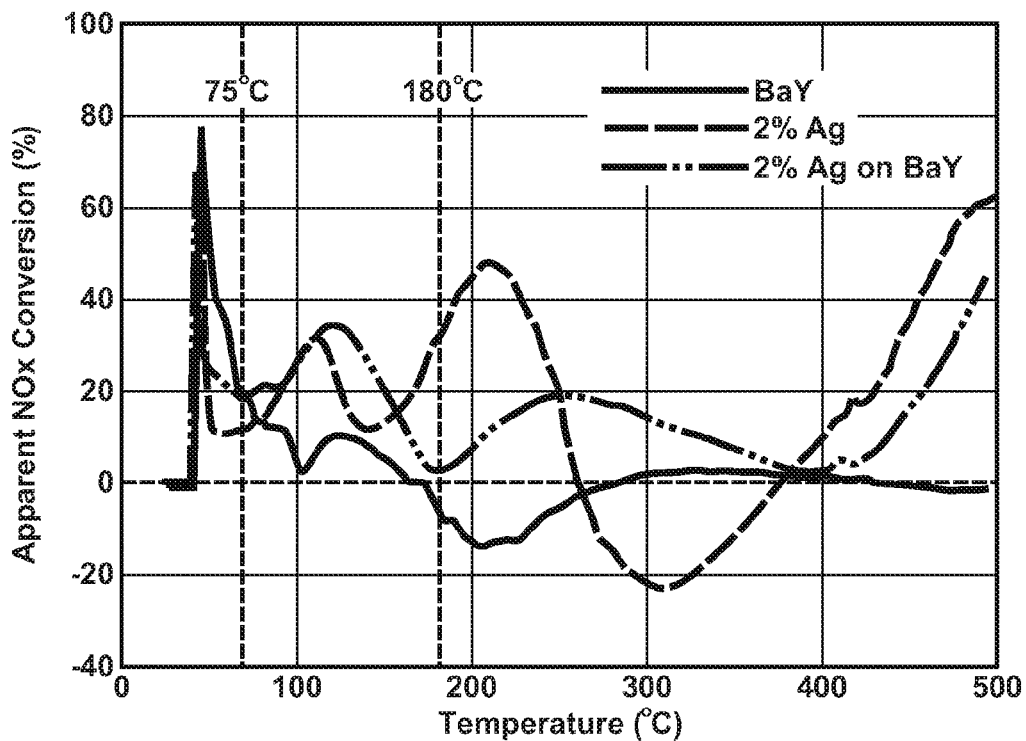
FIG. 5 illustrates apparent NOx conversion percentage values through the startup illustrated in FIG. 2, in accordance with the present disclosure.

In the testing underlying FIG. 2, the storage of NOx produced by the oxidation of NO to $NO_2$ from an NO-containing stream is demonstrated in the testing underlying FIG. 2, where each catalyst was placed in the reactor tube and inserted in a furnace in which it was progressively heated at temperature levels in the range from 35° C. to 500° C. at 36° C. per minute. In an attempt to simulate a cold-start on a vehicle, synthetic gas mixtures consisting of 195 ppm NO, 10 ppm $NO_2$, 500 ppm Hz, 400 ppm carbon monoxide, 238 ppm propene, 96 ppm propane, 2% water, 8% carbon dioxide, 10% oxygen, and the balance nitrogen were flowed through the catalyst particles at a space velocity of SV=30,000 l/h. In FIG. 2 the amount of NOx in ppm stored on each of the catalysts is presented at the vertical axis at the average catalyst temperature (° C.) along the horizontal axis. The NOx concentration (205 ppm) in the inlet stream is indicated by the dashed horizontal line. Thus, NOx concentration values below this line indicate the storage of NOx over the catalyst. The concentration values of absorbed NOx with either BaY alone, 2 wt. % $Ag_2O/Al_2O_3$ alone, or the combination catalyst are presented graphically in FIG. 2. It is seen that the NOx concentration using the silver on BaY catalyst starts decreasing above about 75° C. and as the temperature increases the NOx level remains below the NOx concentration (205 ppm) in the inlet stream. The integrated NOx storage values are shown in FIG. 5. These tests are representative of many tests that confirm the capability of the subject silver on BaY catalyst in oxidation of NO to $NO_2$ and its subsequent storage in oxygen containing exhaust mixtures containing hydrogen.

Three plots of FIG. 2 illustrate operation of three different NOx storage absorbers devices under identical operation in the simulated exhaust stream. A first plot shows a NOx storage device equipped with a BaY zeolite only. A second plot shows a NOx storage device equipped with a silver-based catalyst only. A third plot shows a NOx storage device equipped with a combination of a silver catalyst and a zeolite. Comparing the three plots, the plot showing the NOx storage device equipped with the combination the silver catalyst and the zeolite stores more NOx at low temperatures, resulting in lower NOx concentrations at the downstream SCR device inlet at temperatures below 180° C.

Figure 3:
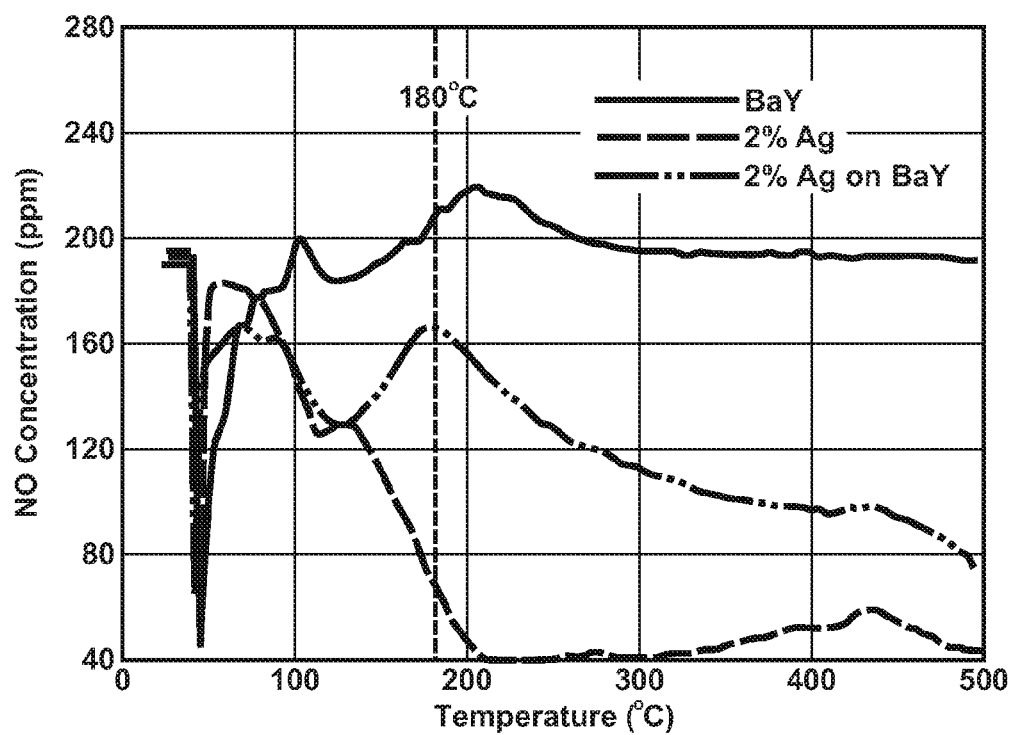
FIG. 3 illustrates NO concentrations through the startup illustrated in FIG. 2, in accordance with the present disclosure.
Figure 4:
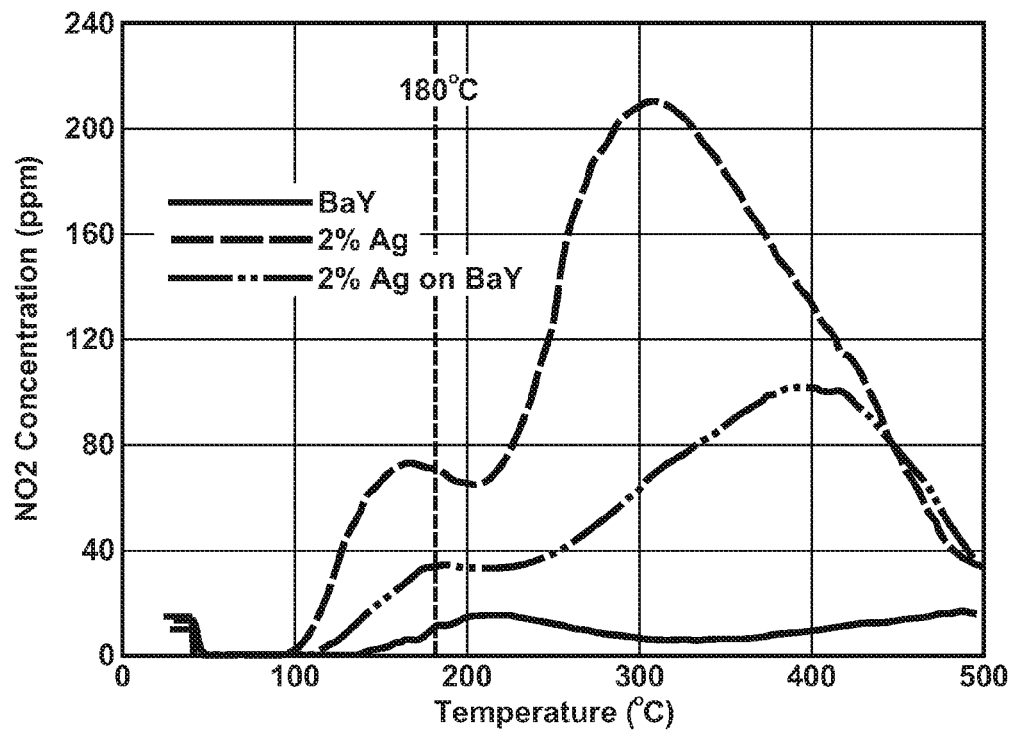
FIG. 4 illustrates $NO_2$ concentration through the startup illustrated in FIG. 2, in accordance with the present disclosure.

FIGS. 3 and 4 illustrate NO and $NO_2$ concentrations, respectively, through the startup illustrated in FIG. 2. The horizontal axis of FIG. 3 illustrates temperature through the startup event, with the measured values beginning at ambient temperature and progressing to the right to a high operating temperature. The vertical axis of FIG. 3 illustrates NO concentration within the exhaust gas flow measured at the inlet of the NOx storage device. Three plots illustrate operation of three different NOx storage devices under identical operation in the simulated exhaust stream. A first plot shows a NOx storage device equipped with a BaY zeolite only. A second plot shows a NOx storage device equipped with a silver-based catalyst only. A third plot shows a NOx storage device equipped with a combination a silver catalyst and a BaY zeolite.

The horizontal axis of FIG. 4 illustrates temperature through the startup event, with the measured values beginning at ambient temperature and progressing to the right to a high operating temperature. The vertical axis of FIG. 4 illustrates $NO_2$ concentration within the exhaust gas flow measured at the outlet of the NOx storage device. Three plots illustrate operation of three different NOx storage devices under identical operation in the simulated exhaust stream. A first plot shows a NOx storage device equipped with a BaY zeolite only. A second plot shows a NOx storage device equipped with a silver-based catalyst only. A third plot shows a NOx storage device equipped with a combination a silver catalyst and a BaY zeolite.

FIG. 5 illustrates apparent NOx conversion percentage values through the startup illustrated in FIG. 2. The horizontal axis of FIG. 5 illustrates temperature through the startup event, with the measured values beginning at ambient temperature and progressing to the right to a high operating temperature. The vertical axis of FIG. 5 illustrates NOx conversion rates determined based upon NOx concentration values measured at the inlet of the NOx storage device and NOx concentration values measured at the outlet of the NOx storage device. A first plot shows a NOx storage device equipped with a BaY zeolite only. A second plot shows a NOx storage device equipped with a silver-based catalyst only. A third plot shows a NOx storage device equipped with a combination a silver catalyst and a BaY zeolite. The third plot shows that the combination the silver catalyst and the BaY zeolite facilitates higher conversion rates of the NOx throughout the low temperature zone until approximately 150° C., whereat the NOx storage capacity of NOx absorber device is increasing with temperature and the SCR device is about to begin actively converting the NOx when the temperature reaches 180° C. The test results illustrate that the increased NOx storage of the silver catalyst combined with the BaY zeolite facilitates higher apparent conversion of NOx in a startup period.

Figure 6:
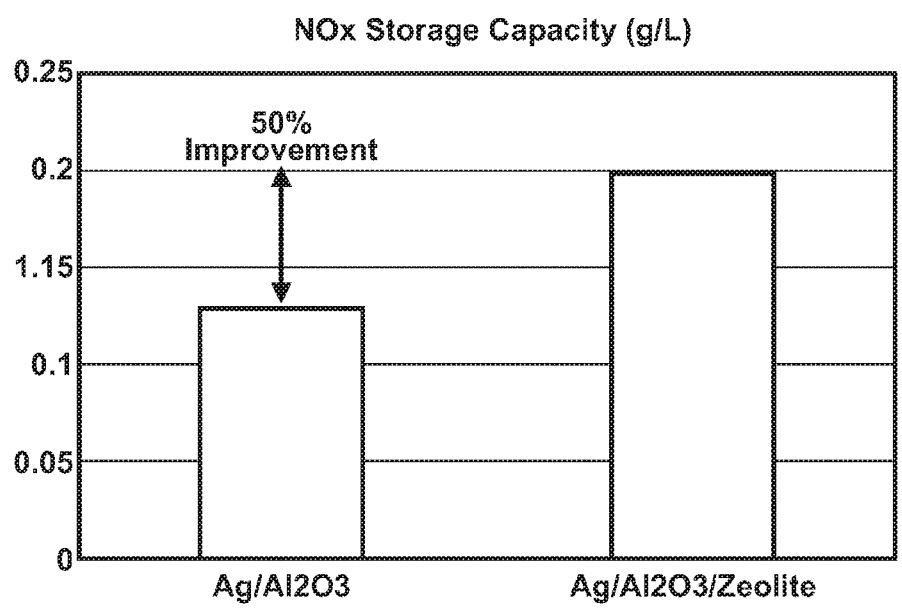
FIG. 6 illustrates exemplary test results showing a gram per liter NOx storage capacity of a device utilizing a silver-based catalyst alone versus a silver-based catalyst combined with a zeolite, in accordance with the present disclosure.

FIG. 6 illustrates exemplary test results showing a gram per liter NOx storage capacity of a device utilizing a silver-based catalyst alone versus a silver-based catalyst combined with a zeolite. The vertical axis illustrates NOx storage capacity in grams per liter of the active material. A left vertical plot show a device with an active material including a silver-based catalyst alone. A right vertical plot show a device with an active material including a silver-based catalyst combined with a zeolite. The exemplary data shows that the silver-based catalyst combined with the zeolite shows approximately a 50% improvement in NOx storage capacity as compared with the silver-based catalyst alone.

The silver-based catalyst and zeolite combination disclosed herein is disclosed for use in an exemplary NOx storage catalyst device to store NOx through a startup period for later treatment after a threshold temperature is reached. Such a device can be located upstream of a device configured to treat the NOx such as an SCR device or an LNT device. However, it will be appreciated that the material combinations disclosed herein for low temperature NOx storage can be used in any device, for example, including a TWC device, located upstream of another device configured to treat the NOx once released. In another embodiment, the material combinations disclosed herein for low temperature NOx storage can be used in any device which can later treat the NOx at higher temperatures in the same device. The device configurations provided herein for example are intended to be non-limiting.

The following include non-limiting examples of preparation of the silver-based catalysts and zeolite materials used in the tests disclosed herein. Other preparation methods can similarly be utilized, and the disclosure is not intended to be limited to the examples provided herein.

The BaY zeolite catalyst was prepared by a conventional ion-exchange method. The ion-exchange was conducted by 2 consecutive ion-exchanges with 0.2 M aqueous solutions of barium nitrates in a mixing ratio of 1.5 cc of the counterpart's metal nitrate solution per 0.2 g zeolite. The degree of ion-exchange was mainly over 50% for the catalysts examined. After the ion exchange, all catalysts prepared were dried overnight in air at 110° C., calcined at 500° C. for 8 hours in air, and ground by mortar and pestle to obtain a homogeneous powder of the samples.

In preparing the BaY—$Ag_2O/Al_2O_3$ catalyst, the $Ag_2O/Al_2O_3$ catalysts (1-5 wt. % $Ag_2O$) were prepared using an incipient wetness impregnation method. Appropriate amounts of $AgNO_3$ were dissolved in deionized water and the solution was added to the pre-determined amount of alumina powder (Boehmite from Sasol) at room temperature. The formed paste was dried at 90° C. for 16 hours and calcined at 540° C. for 2 h in air. The prepared $Ag_2O/Al_2O_3$ catalysts were ball-milled together with deionized water with a solid fraction around 25%. After ball milling for 18 hours, the slurry was washcoated onto monolith core samples (0.75 in. diameter by 0.83-1.0 in. length, and 400 cell per square inch (cpsi)/4 mil wall thickness cordierite) with a targeted total washcoat loading for the $Ag_2O/Al_2O_3$ catalysts of 170 g/L. After washcoating, the monolithic catalyst was dried and calcined at 500° C. for 2 h in air. BaY zeolite was washcoated on the monolithic $Ag_2O/Al_2O_3$ sample prepared above by a similar approach for $Ag_2O/Al_2O_3$ monolithic catalysts. The target washcoat loading for the BaY zeolite is 100 g/L.

The value 170 g/L loading is provided as an exemplary target for the $Ag_2O/Al_2O_3$ catalysts for monolithic samples. A range of loading values from 50-200 g/L could alternatively be utilized for monolithic samples.

The value 100 g/L loading is provided as an exemplary target for BaY zeolite for monolithic samples. A range of loading values from 30-150 g/L could alternatively be utilized for monolithic samples.

The Ag concentration of $Ag_2O/Al_2O_3$ is in the range of 1-15% by weight. The Ba concentration of Ba—Y zeolite is 1-10% by weight.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device for aftertreatment of an exhaust gas flow, the device comprising:
   a silver-based NOx storage catalyst; and
   a zeolite;
   wherein the zeolite is dispersed as a separate layer from the silver-based NOx storage catalyst;
   wherein the silver-based NOx storage catalyst and the zeolite store NOx through a low temperature startup period of exhaust gas flow; and
   wherein the device comprises:
      a first zone comprising the silver-based NOx storage catalysts and the zeolite configured to provide hydrogen-assisted conversion of NO to $NO_2$; and
      a second zone located downstream of the first zone and comprising a platinum-group metal catalyst.

2. The device of claim 1, wherein the device is located upstream of a second device configured to treat the NOx once released.

3. The device of claim 2, wherein the second device comprises a selective catalytic reduction device.

4. The device of claim 2, wherein the second device comprises a lean NOx trap device.

5. The device of claim 1, wherein the device is located upstream of a platinum-group metal catalyst device configured to oxidize carbon monoxide, hydrocarbons, and NO to $NO_2$.

6. The device of claim 1, wherein the zeolite comprises barium Y zeolite.

7. The device of claim 6, wherein the barium Y zeolite is utilized with a total washcoat loading of between 30 grams per Liter and 150 grams per Liter.

8. The device of claim 6, wherein the barium Y zeolite is utilized with a total washcoat loading of 100 grams per Liter.

9. The device of claim 1, wherein the zeolite comprises a base zeolite selected from the group consisting of Y zeolite, beta zeolite, ZSM-5, SSZ-13, and SAPO-34.

10. The device of claim 1, wherein the zeolite comprises a base metal selected from the group consisting of copper, iron, silver, and barium.

11. The device of claim 1, wherein the zeolite is dispersed as a separate layer on top of the silver-based NOx storage catalyst.

12. The device of claim 1, wherein the zeolite is dispersed as a separate layer under the silver-based NOx storage catalyst.

13. The device of claim 1, wherein the silver-based NOx storage catalyst comprises a $Ag_2O/Al_2O_3$ catalyst.

14. The device of claim 13, wherein the $Ag_2O/Al_2O_3$ catalyst is utilized with a total washcoat loading of between 50 grams per Liter and 200 grams per Liter.

15. The device of claim 13, wherein the $Ag_2O/Al_2O_3$ catalyst is utilized with a total washcoat loading of 170 grams per Liter.

16. A device for aftertreatment of an exhaust gas flow, the device comprising:
   a NOx storage catalyst comprising:
      a silver-based NOx storage catalyst; and
      a barium Y zeolite;
   wherein the barium Y zeolite is dispersed as a separate layer from the silver-based NOx storage catalyst and the silver-based NOx storage catalyst and the barium Y zeolite store NOx through a low temperature startup period of exhaust gas flow and are configured to provide hydrogen-assisted conversion of NO to $NO_2$; and
   wherein the device comprises:
      a first zone comprising the silver-based NOx storage catalysts and the barium Y zeolite configured to provide hydrogen-assisted conversion of NO to $NO_2$; and
      a second zone located downstream of the first zone and comprising a platinum-group metal catalyst.

17. The device of claim 16, wherein the silver-based NOx storage catalyst comprises a $Ag_2O/Al_2O_3$ catalyst utilized with a total washcoat loading of between 50 grams per Liter and 200 grams per Liter; and
   wherein the barium Y zeolite is utilized with a total washcoat loading of between 30 grams per Liter and 150 grams per Liter.

18. The device of claim 16, wherein the silver-based NOx storage catalyst comprises a $Ag_2O/Al_2O_3$ catalyst utilized with a total washcoat loading of 170 grams per Liter; and
   wherein the barium Y zeolite is utilized with a total washcoat loading of between 100 grams per Liter.

* * * * *